US008948768B2

(12) United States Patent  
Bienas et al.

(10) Patent No.: US 8,948,768 B2
(45) Date of Patent: Feb. 3, 2015

(54) RADIO COMMUNICATION DEVICE AND METHOD FOR CONTROLLING RESOURCE ALLOCATIONS

(75) Inventors: Maik Bienas, Braunschweig (DE); Achim Luft, Braunschweig (DE); Andreas Schmidt, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 909 days.

(21) Appl. No.: 12/110,675

(22) Filed: Apr. 28, 2008

(65) Prior Publication Data

US 2009/0325634 A1   Dec. 31, 2009

(51) Int. Cl.
*H04W 72/00* (2009.01)
*H04W 72/04* (2009.01)
*H04W 84/04* (2009.01)

(52) U.S. Cl.
CPC ........ *H04W 72/0426* (2013.01); *H04W 84/045* (2013.01)
USPC .......................... 455/450; 455/552.1; 455/444

(58) Field of Classification Search
USPC ........................ 455/450, 552.1, 444; 370/329
See application file for complete search history.

(56) References Cited

U.S. PATENT DOCUMENTS

| | | | |
|---|---|---|---|
| 5,526,402 A | 6/1996 | Dent et al. | |
| 5,898,931 A | 4/1999 | l'Anson et al. | |
| 7,006,847 B2 | 2/2006 | Sato et al. | |
| 7,075,912 B2 | 7/2006 | Suda et al. | |
| 2002/0061766 A1 | 5/2002 | Sato et al. | |
| 2002/0151300 A1* | 10/2002 | Suda et al. | 455/422 |
| 2004/0160923 A1 | 8/2004 | Nobukiyo et al. | |
| 2004/0166812 A1* | 8/2004 | Lumelsky | 455/67.11 |
| 2007/0105527 A1 | 5/2007 | Nylander et al. | |
| 2007/0183427 A1 | 8/2007 | Nylander et al. | |
| 2008/0089354 A1* | 4/2008 | Yoon et al. | 370/432 |
| 2009/0135737 A1 | 5/2009 | Vikberg et al. | |
| 2011/0039566 A1 | 2/2011 | Zee et al. | |

FOREIGN PATENT DOCUMENTS

| | | |
|---|---|---|
| CN | 1437339 | 8/2003 |
| CN | 1521991 | 8/2004 |
| EP | 1 241 903 A2 | 9/2002 |
| EP | 1 209 942 B1 | 10/2005 |
| JP | 09-504665 A | 5/1997 |

(Continued)

OTHER PUBLICATIONS

3GPP TR 25.820 V1.0.0 (Nov. 2007); Technical Report; 3rd Generation Partnership Project; Technical Specification Group Radio Access Networks; 3G Home NodeB Study Item Technical Report (Release 8).

(Continued)

*Primary Examiner* — Ariel Balaoing
(74) *Attorney, Agent, or Firm* — Schwabe, Williamson & Wyatt, P.C.

(57) ABSTRACT

In an embodiment, a radio communication device is provided. The radio communication device may include a radio communication device control message generation circuit configured to generate a radio communication device control message including allocation information to control a radio resource allocation for radio communication devices of at least two groups of radio communication devices, the radio resource allocation being provided by another radio communication device.

24 Claims, 9 Drawing Sheets

(56) References Cited

FOREIGN PATENT DOCUMENTS

| | | | |
|---|---|---|---|
| JP | 2002-165249 A | 6/2002 |
| JP | 2006-261722 A | 9/2006 |
| JP | 2009-510969 A | 3/2009 |
| JP | 2009-539303 A | 11/2009 |
| JP | 2010-538524 A | 12/2010 |
| WO | WO-98/36602 A1 | 8/1998 |
| WO | WO-03/009609 A2 | 1/2003 |
| WO | WO 2004/114704 A2 | 12/2004 |
| WO | WO-2006/119338 | 11/2006 |
| WO | WO-2007/126351 A1 | 11/2007 |

OTHER PUBLICATIONS

3GPP TS 36.300 V8.2.0 (Sep. 2007); Technical Specification; 3rd Generation Partnership Porject; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Mitsubishi Electric; Restricted and Opened Home NodeBs (HNBs); 3GPP TSG RAN WG3 Meeting #56, Kobe, Japan, May 7-11, 2007, pp. 1-3.

Notification of Transmittal of the International Search Report and Written Opinion of the International Searching Authoritiy issued for corresponding application PCT/EP2009/054036, dated of mailing Aug. 4, 2009.

Korean Office Action dated May 18, 2012 issued for corresponding Korean Patent Appl. No. 2010-7024221 (with English translation, relates to Citation AA).

Japanese Office Action dated Jul. 3, 2012, issued for corresponding Japanese Appl. No. 2011-506641 (with English Translation, for Citations BA-BF).

English translation of Chinese Office Action dated Dec. 5, 2012, issued for corresponding Chinese Patent Application No. 2009-80115170.1.

Chinese Office Action dated Aug. 29, 2013 issued for corresponding Chinese Patent Application 2009-80115170 (with English translation).

* cited by examiner

RADIO COMMUNICATION DEVICE AND METHOD FOR CONTROLLING RESOURCE ALLOCATIONS

TECHNICAL FIELD

Embodiments relate generally to radio communication devices and a method for controlling resource allocations.

BACKGROUND

A 'NodeB' may be understood as a base station designed for Universal Mobile Telecommunication System (UMTS) that is controlled by a Radio Network Controller (RNC). A NodeB is usually capable of taking care of up to six UMTS radio cells. All NodeBs and all RNCs together usually form the so-called UMTS Terrestrial Radio Access Network (UTRAN) of a Mobile Network Operator (MNO).

In 3GPP ($3^{rd}$ Generation Partnership Project), concepts are developed for supporting the deployment of so-called 'Home NodeBs' or 'Home eNodeBs' for the following Radio Access Technologies, for example:

3G UMTS (UMTS based on Code Division Multiple Access (CDMA), also referred to as 'UTRA' in 3GPP terminology);
and its successor technology
3.9G LTE (Long Term Evolution, also referred to as 'E-UTRA' in 3GPP terminology).

A 'Home NodeB' or 'Home eNodeB' may be understood in accordance with 3GPP as a trimmed-down version of a base station optimized for use in residential or corporate environments (e.g., private homes, public restaurants or small office areas).

As will be described in more detail below, there is a need for a more flexible allocation of resources (for example radio and network resources) in a mobile radio communication system, which may include one or a plurality of base stations and one or a plurality of home base stations.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which.

DESCRIPTION

In the description, the terms "connection" and "coupling" are intended to include a direct as well as an indirect "connection" and "coupling", respectively.

Although in FIGS. 1 and 2, for reasons of simplicity, the architecture of a UMTS mobile radio system 100 will be described in detail, it is to be noted that the various embodiments are also provided for any other suitable mobile radio system such as e.g. LTE (Long Term Evolution).

Figure 1:
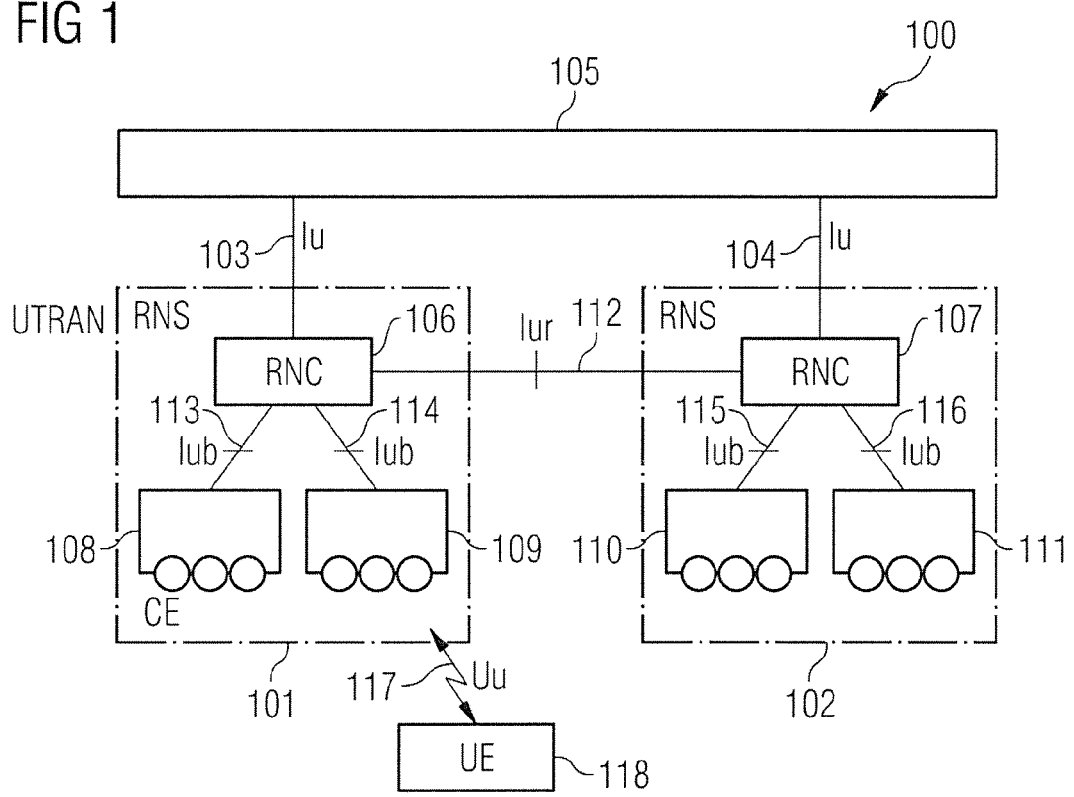
FIG. 1 shows a communication system based on an embodiment.

FIG. 1 shows a UMTS (Universal Mobile Telecommunication System) mobile radio system 100, and for reasons of simpler illustration particularly the components of the UMTS mobile radio access network (UMTS Terrestrial Radio Access Network, UTRAN), which has a plurality of mobile radio network subsystems (RNS) 101, 102 which are respectively connected by means of an "Iu" interface 103, 104 to the core network (CN) 105 in UMTS. A mobile radio network subsystem 101, 102 has a respective mobile radio network control entity (Radio Network Controller, RNC) 106, 107 and also one or more base stations 108, 109, 110, 111, which are also called NodeB in UMTS. In an embodiment, a 'NodeB' may be understood as a base station designed for UMTS that is controlled by a Radio Network Controller (RNC) 106, 107. A NodeB is usually capable of taking care of a plurality of, e.g. of up to six UMTS mobile radio cells. All NodeBs and all RNCs together usually form the so-called UMTS Terrestrial Radio Access Network (UTRAN) of a Mobile Network Operator (MNO).

As will be described in more detail below, some of the base stations (in this example, the base stations denoted with reference numbers 109 and 111, may be configured as Home NodeBs. In an example, a 'Home NodeB' may be understood in accordance with 3GPP as a trimmed-down version of a base station optimized for use in residential or corporate environments (e.g., private homes, public restaurants or small office areas). In various examples throughout this description, the terms 'Home Base Station', 'Home NodeB', 'Home eNodeB', and 'Femto Cell' are referring to the same logical entity and will be used interchangeably throughout the entire description.

As will be described in more detail below, the devices and methods in accordance with various embodiments e.g. for supporting the deployment of 'Home NodeBs' for 3G and the deployment of 'Home eNodeBs' for 3.9G Radio Access Technologies (RATs), such as UTRA and E-UTRA, allow a Mobile Network Operator (MNO) to dynamically distribute radio resources of a Home Base Station (HBS) among users of a closed subscriber group and public users (in the following also referred to as public subscriber group) that are also in coverage of the respective 'Home NodeB' or 'Home eNodeB'.

This may be applied e.g. in special occasions (e.g., overload situations in the macro network architecture requiring load balancing or coverage improvement e.g. in buildings), where the Mobile Network Operator (MNO) would wish to be able to do exactly this, since he did some investment in the frequency spectrum and he may have also subsidized the 'Femto Cell' box. In this context, it should be considered that a Mobile Network Operator (MNO) could hardly plausibly explain to public users passing by a number of 'Femto Cells' associated with his network that they cannot be satisfactorily served due to overload situations in the macro network architecture or poor coverage in buildings, while at the same time there are plenty of 'Femto Cells' around still offering some free capacity.

Additionally, the devices and methods in accordance with various embodiments allow the owner of a Home Base Station (HBS) to request certain resource allocations for the radio interface (between the mobile terminals and the HBS) as well as for the broadband interface connecting the HBS to the core network.

This scenario may be applied e.g. in occasions when the owner wants to ensure a minimum performance of devices other than those that are using the broadband connection via the Home Base Station, such as a legacy Personal Computer (PC) evoking 'normal' internet traffic.

Within a mobile radio access network according to UTRAN, the mobile radio network control entities 106, 107 of the individual mobile radio network subsystems 101, 102 are connected to one another by means of an "Iur" interface 112. Each mobile radio network control entity 106, 107 respectively monitors the assignment of mobile radio resources for all the mobile radio cells in a mobile radio network subsystem 101, 102.

A base station 108, 109, 110, 111 is respectively connected to a mobile radio network control entity 106, 107 associated with the base station by means of an "Iub" interface 113, 114, 115, 116.

Each base station 108, 109, 110, 111 illustratively may provide radio coverage for one or more mobile radio cells (CE) within a mobile radio network subsystem 101, 102. Between a respective base station 108, 109, 110, 111 and a subscriber terminal 118 (user equipment, UE), subsequently also called mobile radio terminal, in a mobile radio cell, message signals or data signals may be transmitted using an air interface, called "Uu" air interface 117 in UMTS, e.g. using a multiple access transmission method.

By way of example, the UMTS-FDD mode (Frequency Division Duplex) is used to achieve separate signal transmission in the uplink and downlink directions (Uplink: signal transmission from the mobile radio terminal 118 to the respective UMTS base station 108, 109, 110, 111; downlink: signal transmission from the respective associated UMTS base station 108, 109, 110, 111 to the mobile radio terminal 118) through appropriate separate assignment of frequencies or frequency ranges.

A plurality of subscribers, in other words a plurality of activated mobile radio terminals 118 registered in the mobile radio access network, in the same mobile radio cell may have their signaling separated from one another using orthogonal codes, particularly using the "CDMA method" (Code Division Multiple Access).

In this context, it should be noted that FIG. 1 only shows one mobile radio terminal 118 for reasons of a simple illustration. In general, however any number of mobile radio terminals 118 may be provided in the mobile radio system 100 in other embodiments.

As mentioned above, it should be noted that FIG. 1 shows the UMTS network architecture, but the principles of the various disclosed embodiments are provided as well for other radio access technologies (RATs), such as e.g. LTE.

The communication between a mobile radio terminal 118 and another communication terminal can be set up using a complete mobile radio communication link to another mobile radio terminal, alternatively to a landline communication terminal.

Figure 2:
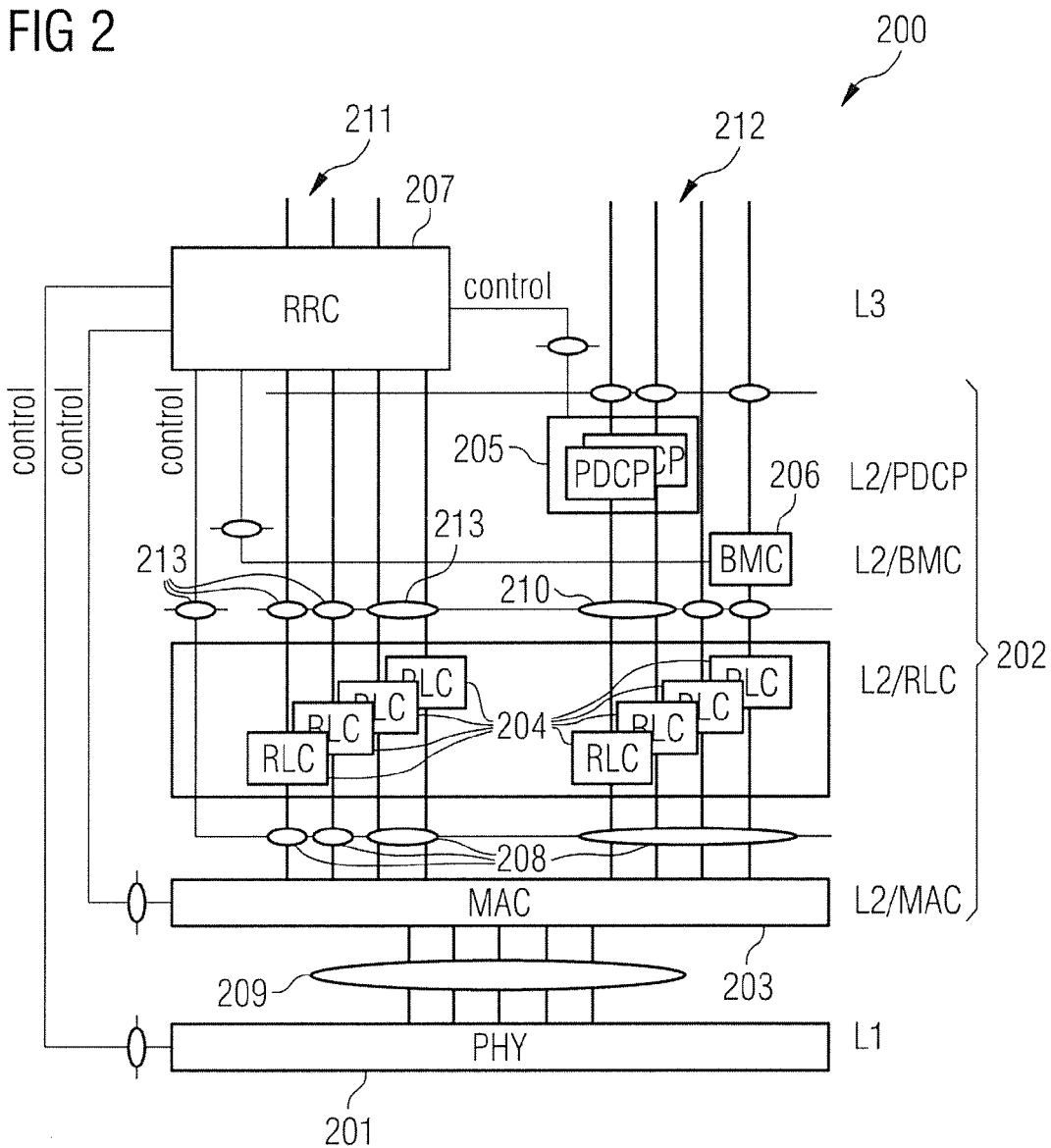
FIG. 2 shows an illustration of a protocol structure for the UMTS air interface in accordance with an embodiment.

As FIG. 2 shows, the UMTS air interface 117 is logically divided into three protocol layers (symbolized in FIG. 2 by a protocol layer arrangement 200). The entities ensuring and providing the functionality of the respective protocol layers described below are implemented both in the mobile radio terminal 118 and in the UTRAN base station 108, 109, 110, 111 or in the respective UTRAN mobile radio network control entity 106, 107. It should be noted that in case of LTE the entities ensuring and providing the functionality of the respective protocol layers may be implemented in the mobile radio terminal 118 and in the corresponding E-UTRAN base stations. The respective entities may be implemented in circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit" in accordance with an alternative embodiment.

FIG. 2 shows the UMTS protocol structure 200 for instance from the viewpoint of a dedicated transport channel in accordance with an embodiment.

The bottommost layer shown in FIG. 2 is the physical layer PHY 201, which represents the protocol layer 1 on the basis of the OSI reference model (Open System Interconnection) on the basis of the ISO (International Standardisation Organisation).

The protocol layer arranged above the physical layer 201 is the data link layer 202, protocol layer 2 on the basis of the OSI reference model, which for its part has a plurality of subprotocol layers, namely the Medium Access Control protocol Layer (MAC protocol layer) 203, the Radio Link Control protocol layer 204 (RLC protocol layer), the Packet Data Convergence Protocol protocol layer 205 (PDCP protocol layer), and also the Broadcast/Multicast Control protocol layer 206 (BMC protocol layer), for example.

The topmost layer of the UMTS air interface Uu is the mobile radio network layer (protocol layer 3 on the basis of the OSI reference model), having the mobile radio resource control entity 207 (Radio Resource Control protocol layer, RRC protocol layer).

Each protocol layer 201, 202, 203, 204, 205, 206, 207 may provide the protocol layer above it with its services via prescribed, defined service access points.

To provide a better understanding of the communication protocol layer architecture, the service access points have been provided with generally customary and unambiguous names, such as logical channels 208 between the MAC protocol layer 203 and the RLC protocol layer 204, transport channels 209 between the physical layer 201 and the MAC protocol layer 203, radio bearers (RB) 210 between the RLC protocol layer 204 and the PDCP protocol layer 205 or the BMC protocol layer 206, and also signalling radio bearers (SRB) 213 between the RLC protocol layer 204 and the RRC protocol layer 207.

On the basis of UMTS, the protocol structure 200 shown in FIG. 2 is split not just horizontally into the above-described protocol layers and units of the respective protocol layers, but also vertically into a "control protocol plane" 211 (Control plane, C plane), which contains parts of the physical layer 201, parts of the MAC protocol layer 203, parts of the RLC protocol layer 204 and also the RRC protocol layer 207, and the user protocol plane 212 (User plane, U plane), which contains parts of the physical layer 201, parts of the MAC protocol layer 203, parts of the RLC protocol layer 204, the PDCP protocol layer 205 and also the BMC protocol layer 206.

In LTE the protocol structure looks similar to the protocol structure for UMTS shown in FIG. 2 with the one difference in that the LTE "control protocol plane" may also contain parts of the PDCP protocol layer.

The entities of the control protocol plane 211 may be used to transmit exclusively control data, which are required for setting up and clearing down and also maintaining a communication link, whereas the entities of the user protocol plane 212 may be used to transmit the actual user data (or useful data).

Each communication protocol layer or each entity of a respective communication protocol layer may have particular prescribed functions during mobile radio communication. The transmitter end may need to ensure the task of the physical layer 201 or of the entities of the physical layer 201, the secure transmission via the air interface 117 of data coming from the MAC protocol layer 203. In this connection, the data may be mapped onto physical channels (not shown in FIG. 2). The physical layer 201 may provide the MAC protocol layer 203 with its services via transport channels 209 and these may be used to stipulate how and with what characteristics the data are to be transported via the air interface 117. The fundamental functions which may be provided by the entities of the physical layer 201 may include channel coding, modulation and CDMA code spreading (or the corresponding functions in LTE with respect to OFDMA). Correspondingly, the physical layer 201 or the entities of the physical layer 201 at the receiver end may carry out the CDMA code despreading, demodulation and the decoding of the received data and then forward these data to the MAC protocol layer 203 or entities of the MAC layer 203 at the receiver for further processing.

The MAC protocol layer 203 or the entities of the MAC protocol layer 203 may provide the RLC protocol layer 204 with its or their services using logical channels 208 as service access points and these may be used to characterize what type of file the transported data involve. The task of the MAC protocol layer 203 in the transmitter, e.g., during data transmission in the uplink direction in the mobile radio terminal 118, may be particularly to map the data which are present on a logical channel 208 above the MAC protocol layer 203 onto the transport channels 209 of the physical layer 201. The physical layer 201 may provide the transport channels 209 with discrete transmission rates for this. It may therefore be a function of the MAC protocol layer 203 or of the entities of the MAC protocol layer 203 in the mobile radio terminal 118 in the transmission situation to select a suitable transport format (TF) for each configured transport channel on the basis of the respective current data transmission rate and the respective data priority of the logical channels 208 which may be mapped onto the respective transport channel 209, and also the available transmission power of the mobile radio terminal 118 (UE). A transport format contains, inter alia, a stipulation of how many MAC data packet units, called transport block, may be transmitted, in other words transferred, to the physical layer 201 via the transport channel 209 per transmission period TTI (Transmission Time Interval). The admissible transport formats and also the admissible combinations of the transport formats for the various transport channels 209 may be signalled to the mobile radio terminal 118 by the mobile radio network control unit 106, 107 when a communication link is set up. In the receiver, the entities of the MAC protocol layer 203 may split the transport blocks received on the transport channels 209 over the logical channels 208 again.

In UMTS, the MAC protocol layer or the entities of the MAC protocol layer 203 may have a plurality of e.g. three logical entities. The "MAC-d entity" (MAC dedicated entity) may handle the useful data and the control data, which are mapped onto the dedicated transport channels DCH (Dedicated Channel) via the corresponding dedicated logical channels DTCH (Dedicated Traffic Channel) and DCCH (Dedicated Control Channel). The MAC-c/sh entity (MAC control/shared entity) may handle the useful data and the control data from logical channels 208, which are mapped onto the common transport channels 209, such as the common transport channel RACH (Random Access Channel) in the uplink direction or the common transport channel FACH (Forward Access Channel) in the downlink direction. The MAC-b entity (MAC broadcast entity) may handle only the mobile radio cell-related system information, which is mapped via the logical channel BCCH (Broadcast Control Channel) onto the transport channel BCH (Broadcast Channel) and is transmitted by broadcast to all of the mobile radio terminals 118 in the respective mobile radio cell. In LTE, the MAC protocol layer differs from UMTS, as there is no distinction between the different types of MAC entities MAC-d, MAC-c/-sh and MAC-b.

Using the UMTS RLC protocol layer 204 or using the entities of the RLC protocol layer 204, the RRC protocol layer 207 may be provided with its services by means of signalling radio bearers (SRB) 213 as service access points, and the PDCP protocol layer 205 and the BMC protocol layer 206 are provided with their services by means of radio bearers (RB) 210 as service access points. The signalling radio bearers and the radio bearers may characterize the way in which the RLC protocol layer 204 may need to handle the data packets. To this end, by way of example, the RRC protocol layer 207 stipulates the transmission mode for each configured signalling radio bearer or radio bearer. The following transmission modes are provided in UMTS:

Transparent mode (TM),
Unacknowledged mode (UM), or
Acknowledged mode (AM).

The RLC protocol layer 204 may be implemented such that there is an independent RLC entity for each radio bearer or signalling radio bearer. In addition, the task of the RLC protocol layer or of its entities 204 in the transmission device is to split or assemble the useful data and the signalling data from radio bearers or signalling radio bearers into data packets. The RLC protocol layer 204 may transfer the data packets produced after the split or the assembly to the MAC protocol layer 203 for further transport or for further processing.

The PDCP protocol layer 205 or the entities of the PDCP protocol layer 205 may be set up to transmit or to receive data from the "Packet Switched Domain" (PS domain). The main function of the PDCP protocol layer 205 may be to compress or decompress the IP header information (Internet Protocol header information).

The BMC protocol layer 206 or its entities may be used to transmit or to receive "cell broadcast messages" via the air interface.

The RRC protocol layer 207 or the entities of the RRC protocol layer 207 may be responsible for setting up and clearing down and reconfiguring physical channels, transport channels 209, logical channels 208, signalling radio bearers 213 and radio bearers 210 and also for negotiating all of the parameters of the protocol layer 1, i.e. of the physical layer 201 and of the protocol layer 2. To this end, the RRC entities, i.e. the entities of the RRC protocol layer 207, in the mobile radio network control unit 106, 107 and the respective mobile radio terminal 118 may interchange appropriate RRC messages, via the signalling radio bearers 213.

In contrast to UMA technologies (Unlicensed Mobile Access: telecommunication technique allowing seamless roaming and handover between wireless local area networks operating in the unlicensed frequency bands, such as Bluetooth, DECT or WiFi, and wireless wide area networks, such as GSM/GPRS or UMTS, a 'Home NodeB' or 'Home eNodeB' as defined by 3GPP may be under control of a Mobile Network Operator (MNO) and will be operated only on frequencies that are assigned to a specific MNO by license agreements. These frequencies were, by way of example, sold by auction to the MNO.

As will be described in more detail below, various embodiments address an increasing threat from the convergence of WiFi, VoIP and fixed telephony inside people's homes that today's mobile network operators perceive. Various embodiments provide ways to increase the mobile network operators' share of the residential calls market. The so-called 'Home Base Station' concept shall support receiving and initiating cellular calls at home, and uses a broadband connection (typically DSL, cable modem or fibre optics) to carry traffic to the operator's core network bypassing the macro network architecture (including legacy NodeBs or E-NodeBs, respectively), i.e. the legacy UTRAN or E-UTRAN, respectively. Femto Cells shall operate with all existing and future handsets rather than requiring customers to upgrade to expensive dual-mode handsets or UMA devices.

From the customer's perspective, 'Home NodeBs' offer the user a single mobile handset with a built-in personal phonebook for all calls, whether at home or elsewhere. Furthermore, for the user, there is only one contract and one bill. Yet another effect of providing 'Home NodeBs' may be seen in the improved indoor network coverage as well as in the increased traffic throughput. Moreover, power consumption may be reduced as the radio link quality between a handset and a 'Home Base Station' may be expected to be much better than the link between a handset and legacy 'NodeB'.

In an embodiment, access to a 'Home NodeB' may be allowed for a closed user group only, i.e. the communication service offering may be restricted to employees of a particular company or family members, in general, to the members of the closed user group. This kind of 'Home Base Stations' may be referred to as 'Closed Subscriber Group Cells' (CSG Cells) in 3GPP. A cell which indicates being a CSG Cell may need to provide its CSG Identity to the UEs 118. Such a cell may only be suitable for a UE 118 if its CSG Identity is in the UE's 118 CSG white list (a list of CSG Identities maintained in the UE 118 or in an associated smart card indicating the cells which a particular UE 118 is allowed to use for communication).

As a 'Femto Cell' entity will be a box of small size and physically under control of the user it could be used nomadically, i.e. the user may decide to operate it in his apartment, but also in a hotel when he is away from home, e.g. as a business traveller. Additionally a 'Home NodeB' may be operated only temporarily, i.e. it can be switched on and off from time to time, e.g. because the user does not want to operate it over night or when he leaves his apartment. The operation modes described here represent new challenges to the MNO's core network. Legacy Base Stations may be operated permanently at a fixed location, and the MNO allocates a different set of radio resources (e.g., carrier frequencies, time slots and/or codes, etc.) to neighboring NodeBs or eNodeBs in his communication network in order to minimize mutual interference between them.

Figure 3:
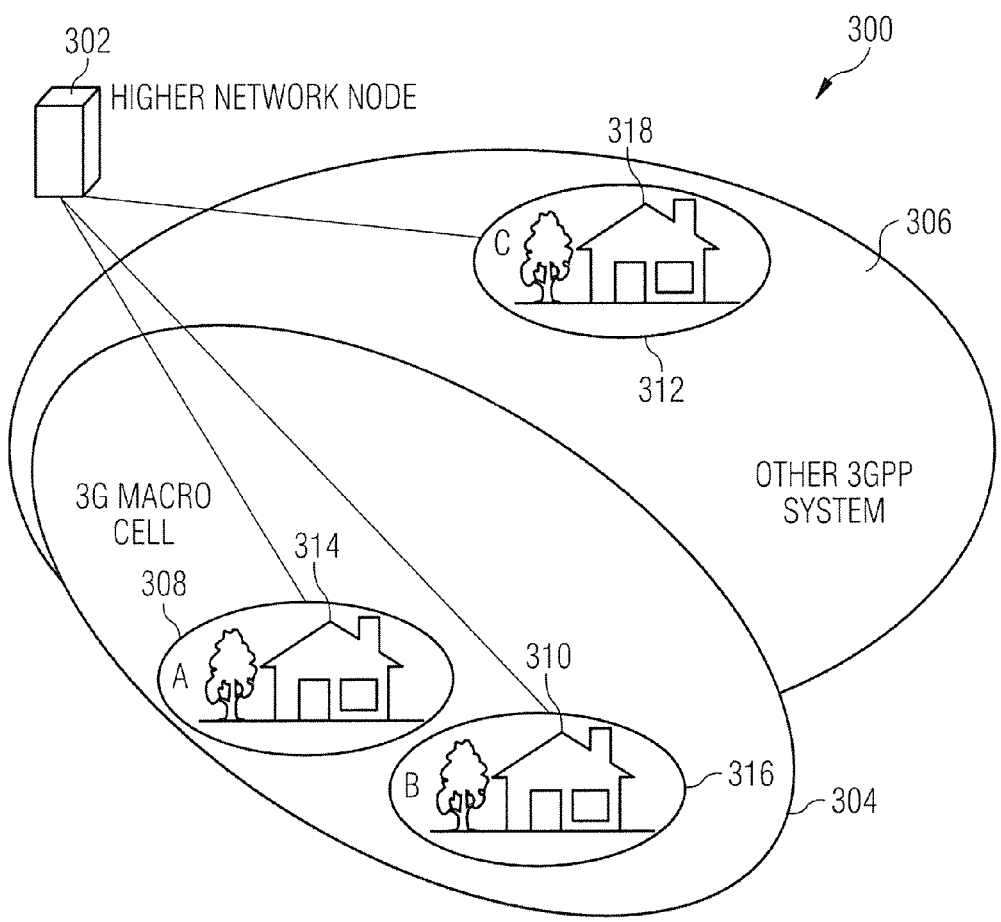
FIG. 3 shows a possible deployment scenario for three Home NodeBs in accordance with an embodiment.

FIG. 3 shows a possible deployment scenario for three Home NodeBs in accordance with an embodiment in an illustration 300. In this example, a higher network node 302 is shown, which symbolizes all entities of the mobile radio system provided "above" the NodeBs and Home NodeBs. Furthermore, FIG. 3 shows a first mobile radio macro cell 304, provided by a first provider in accordance with a first 3GPP mobile radio communication system, and a second mobile radio macro cell 306, provided by a second provider in accordance with a second 3GPP mobile radio communication system. The first and second providers may be the same provider or different providers. Furthermore, the first and second 3GPP mobile radio communication systems may be the same 3GPP mobile radio communication system or different 3GPP mobile radio communication systems. In an example, the first 3GPP mobile radio communication system may be an LTE mobile radio communication system, and the second 3GPP mobile radio communication system may be a UMTS mobile radio communication system. However, the embodiments are not limited to neither LTE nor UMTS, not even to a 3GPP mobile radio communication system. Any other suitable mobile radio communication system may be used in the context of the described embodiments, e.g. any suitable Licensed Mobile Access mobile radio communication system, such as e.g. a Freedom of Mobile Multimedia Access (FOMA) mobile radio communication system or a Code Division Multiple Access 2000 (CDMA 2000) mobile radio communication system.

As also shown in FIG. 3, in each mobile radio macro cell 304, 306, there may be provided one or more mobile radio micro cells (in the following also referred to as Home NodeB cells) 308, 316, 312, which may be provided by respective Home NodeBs 314, 310, 318. The Home NodeBs 314, 310, 318, may be connected to the respective entities of the higher network node 302 in accordance with the technology provided in the respective mobile radio communication system.

Figure 4:
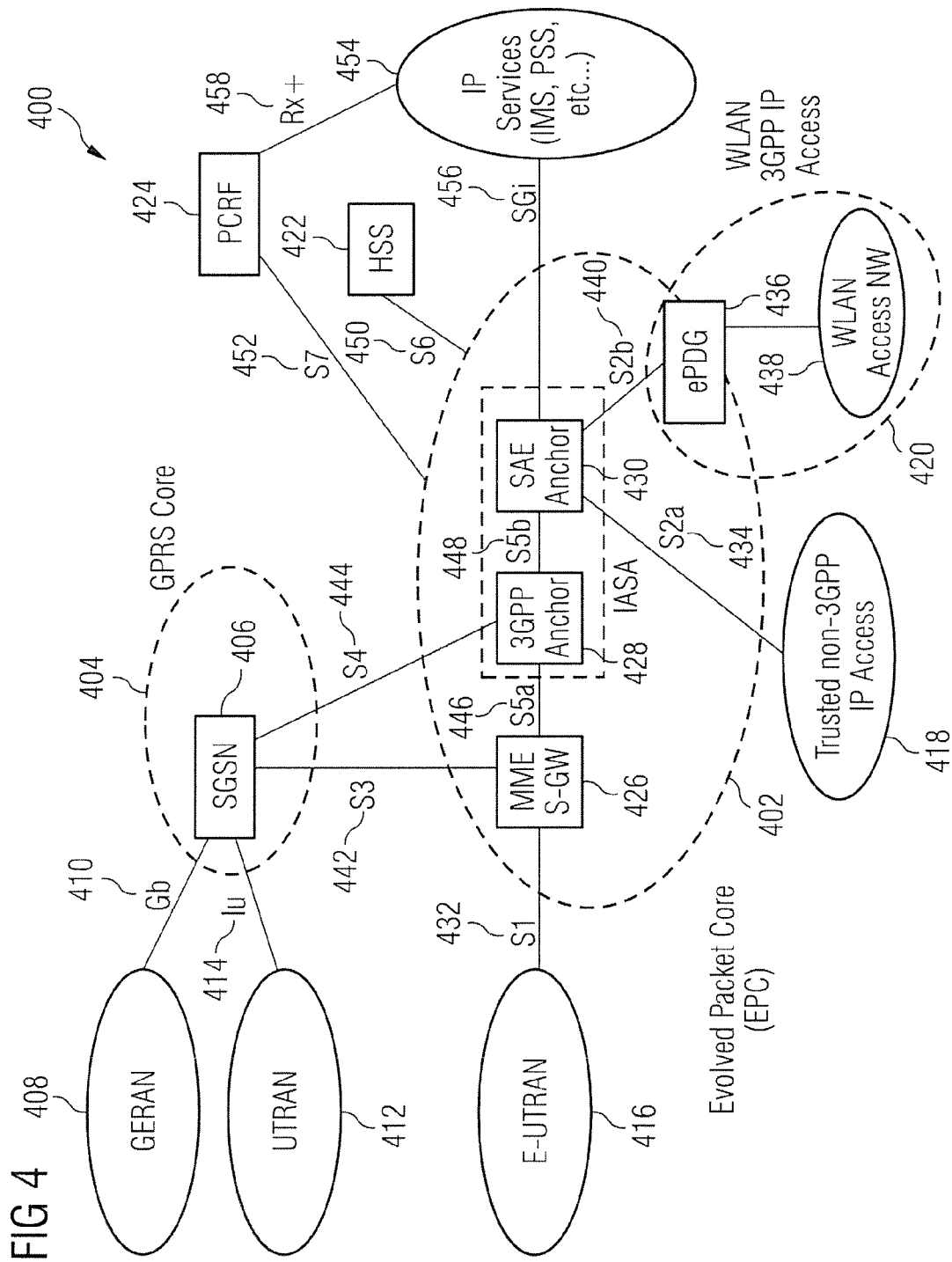
FIG. 4 shows an overview of the general 3GPP Network Architecture with three different Radio Access Networks in accordance with an embodiment.

FIG. 4 shows an overview of a general 3GPP Network Architecture 400 with three different Radio Access Networks (RANs). The 3GPP Network Architecture 400 may include an Evolved Packet Core (EPC) 402 and a General Packet Radio Service (GPRS) Core 404, which may be connected with each other by various interfaces, as will be described in more detail below. As shown in FIG. 4, the GPRS Core 404 may include a Serving GPRS Support Node (SGSN) 406, which may be coupled to different Radio Access Networks, such as e.g. to a GSM EDGE Radio Access Network (GERAN) 408 (which may also be referred to as 2G or 2.5G) via a Gb interface 410, and/or to a UMTS Terrestrial Radio Access Network (UTRAN) 412 via an Iu interface 414. In an embodiment, UTRAN stands for UMTS Terrestrial Radio Access Network and is a collective term for the NodeBs and Radio Network Controllers (RNCs) which make up the UMTS radio access network. This communications network, commonly referred to as 3G, can carry many traffic types from real-time Circuit Switched to IP based Packet Switched. The UTRAN may contain at least one NodeB that is connected to at least one Radio Network Controller (RNC). An RNC may provide control functionalities for one or more NodeB(s). A NodeB and an RNC may be the same device, although typical implementations may have a separate RNC located in a central location serving multiple NodeBs. An RNC together with its corresponding NodeBs are called the Radio Network Subsystem (RNS). There may be more than one RNS provided per UTRAN.

Furthermore, in an embodiment, the following entities or components may be provided in the general 3GPP Network Architecture 400:
- an evolved UMTS Terrestrial Radio Access Network (E-UTRAN) 416;
- a trusted non-3GPP Internet Protocol (IP) access network 418 and connected therewith trusted non-3GPP Internet Protocol (IP) devices, in other words, trusted non-3GPP devices which may access the EPC 402 using the Internet Protocol stack;
- a Wireless Local Area network (WLAN) 3GPP Internet Protocol (IP) access network 420 and connected therewith Wireless Local Area network (WLAN) 3GPP Internet Protocol (IP) devices, in other words, WLAN 3GPP devices which may access the EPC 402 using the Internet Protocol stack;
- a Home Subscriber Server (HSS) 422;
- a Policy and Charging Rules Function (PCRF) entity 424.

E-UTRAN may be understood as being the new 3GPP Radio Access Network for LTE (3.9G) that is currently being worked on. The proposed E-UTRA air interface may use OFDMA for the downlink transmission direction (tower to handset) and Single Carrier FDMA (SC-FDMA) for the uplink transmission direction (handset to tower). It may employ MIMO (Multiple-Input Multiple-Output) with a plurality of antennas, e.g. with up to four antennas per station. The use of OFDM (Orthogonal Frequency Division Multiplexing) may enable E-UTRA to be much more flexible in its use of spectrum than the older CDMA based systems, such as e.g. UTRAN. OFDM has a link spectral efficiency greater than CDMA, and when combined with modulation formats such as 64QAM (Quadrature Amplitude Modulation), and techniques as MIMO, E-UTRA is expected to be considerably more efficient than W-CDMA (Wideband CDMA) with HSDPA (High Speed Downlink Packet Access) and HSUPA (High Speed Uplink Packet Access).

Furthermore, as will be described in more detail below, the EPC 402 may include a Mobility Management Entity (MME) and a Serving Gateway (S-GW) (in FIG. 4 shown as one entity MME S-GW 426; however, the MME and the S-GW may also be implemented in separate devices), a 3GPP Anchor entity 428 and an SAE (System Architecture Evolution) Anchor entity 430.

In an embodiment, the E-UTRAN 416 may be connected to the MME S-GW 426 in the EPC 402 via an S1 interface 432.

Furthermore, the trusted non-3GPP IP entity 418 may be connected to the SAE Anchor entity 430 via an S2 a interface 434. In an embodiment, the S2 a interface 434 may be based on the Proxy Mobile IPv6 (PMIP) and in order to support accesses that do not support PMIP also Mobile IPv4.

The WLAN entity 420 may include an ePDG (Evolved Packet Data Gateway) 436 and a WLAN access network 438. The ePDG 436 may be connected to the SAE Anchor entity 430 via an S2 b interface 440, which may provide the user plane with related control and mobility support between ePDG 436 and a Packet Data Network (PDN) Gateway of the EPC 402. In an embodiment, the S2 b interface 440 may be based on the Proxy Mobile IPv6 (PMIP).

Furthermore, the SGSN 406 may be connected to the MME S-GW 426 in the EPC 402 via an S3 interface 442, which may provide and enable a user and bearer information exchange for inter 3GPP access network mobility in idle and/or active state. In an embodiment, the S3 interface 442 may be based on the GPRS tunneling protocol (GTP) and the Gn interface as it may be provided between SGSNs. The SGSN 406 may further be connected to the 3GPP Anchor entity 428 via an S4 interface 444, which may provide the user plane with related control and mobility support between the GPRS Core and the 3GPP Anchor function of the S-GW and may be based on the GTP protocol and the Gn reference point as provided between SGSN and GGSN.

The MME S-GW 426 may be connected to the 3GPP Anchor entity 428 via an S5 a interface 446 and the 3GPP Anchor entity 428 may be connected to the SAE Anchor entity 430 via an S5 b interface 448.

Furthermore, the HSS 422 may be connected to the EPC 402 via an S6 interface 450, which may provide or enable transfer of subscription and authentication data for authenticating/authorizing user access to the evolved system (AAA interface) between the MME and the HSS 422.

The PCRF 424 may be connected to the EPC 402 via an S7 interface 452, which may provide transfer of Quality of Service (QoS) policy and charging rules from the PCRF 424 to the Policy and Charging Enforcement Function (PCEF) in the PDN Gateway of the EPC 402. In an embodiment, the S7 interface 452 may be based on the Gx interface.

IP services such as e.g. (3G) IP Multimedia Subsystem (IMS), (3G) Packet Switches Streaming (PSS), etc., may be provided via an SGi interface 456 to the SAE Anchor entity 430 and/or via an Rx+ interface 458 to the PCRF 424. In an embodiment, the SGi interface 456 may be the interface between the PDN Gateway and the packet data network. The packet data network may be an operator external public or private packet data network or an intra operator packet data network, e.g. for provision of IP services such as e.g. of IMS. The SGi interface 456 may correspond to the Gi and Wi interfaces and support any 3GPP or non-3GPP access. The Rx+ interface 458 may correspond to the Rx interface and is the interface between the IP services and the PCRF 424.

In the following embodiment an LTE system (E-UTRAN) supporting the concept of 'Home eNodeBs' is considered. It should be mentioned that the embodiments and examples described herein can easily be adapted to other Radio Access Technologies (RATs), such as UMTS (UTRAN) or GSM (GERAN) in alternative embodiments and examples. In E-UTRAN the eNodeBs are illustratively more intelligent than legacy NodeBs of a UTRAN system, since almost all the RNC functionality has been moved to the eNodeB.

Figure 5:
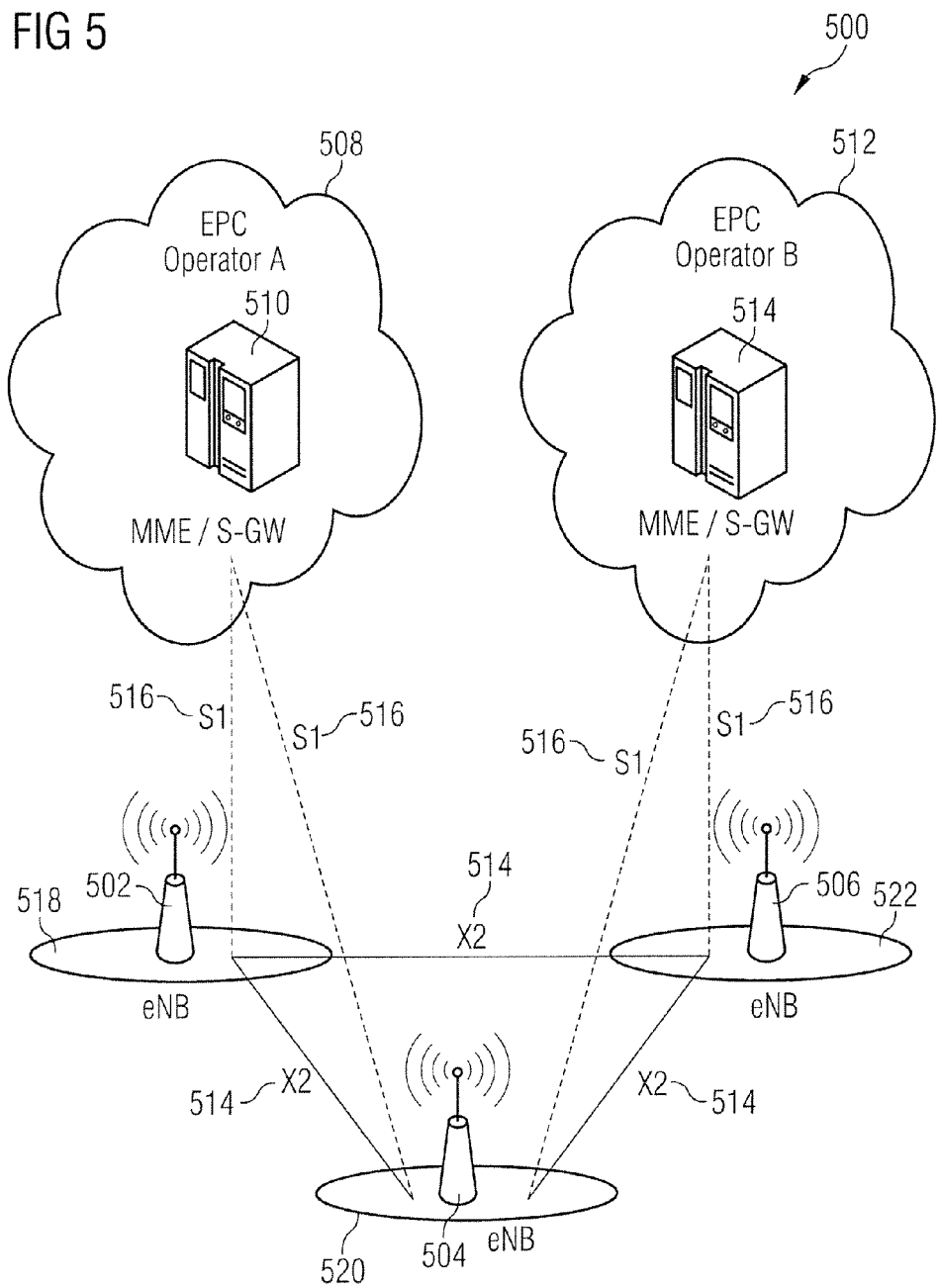
FIG. 5 shows an E-UTRAN architecture in accordance with an embodiment.

FIG. 5 shows an example E-UTRAN architecture 500 including three eNodeBs 502, 504, 506, two Evolved Packet Cores (EPCs), e.g. a first EPC 508, provided by a first operator A and including a first MME/S-GW 510, and a second EPC 512, provided by a second operator B and including a second MME/S-GW 514. In LTE, the eNodeBs 502, 504, 506, are interconnected with each other by means of the X2 interfaces 514. Furthermore eNodeBs 502, 504, 506, are connected by means of the S1 interfaces 516 to the MME/S-GW 510, 514, of the respective EPC 508, 512. The S1 nterface 516 as defined by 3GPP may support a many-to-many relation between EPC 508, 512, and eNodeB 502, 504, 506, i.e. theoretically different operators may simultaneously operate the same eNodeB 502, 504, 506. The eNodeBs 502, 504, 506, may provide mobile radio coverage for the radio communication terminal device located in the respective mobile radio cells 518, 520, 522.

As will be described in more detail below, various embodiments may be based on the exchange of control messages between the MNO's Core Network (CN) and the Radio Access Network (RAN), where the 'Home NodeBs' are located.

A Mobile Network Operator (MNO) may be enabled to distribute the radio resources allocated to a 'Home NodeB' dynamically among users of a closed subscriber group and public users (users of a "public subscriber group") that are passing by.

Various embodiments may have various effects, a few of which are described in detail below:

Both coverage and service may be generally improved for public users passing by, as overload situations in the macro network architecture may be hidden from the customers and do not lead to a rejection of service attempts. In overload situations in the macro network architecture, public users may still be served (e.g., for a certain amount of time) by deployed 'Home Base Stations' nearby that have some capacity left.

Various embodiments even pave the way for new business models between an MNO and his customers: The owner of the 'Home Base Stations' might get some compensation for allowing the Mobile Network Operator (MNO) to reconfigure his 'Home Base Stations' (e.g., temporarily) as the need arises (based on tariff agreement between MNO and customer).

In an embodiment, the flow of messages is extended over the air interface connecting the Radio Access Network (RAN) with the mobile device, which is also referred to as 'UE' (UE=User Equipment in 3GPP terminology). In this embodiment, the Mobile Network Operator (MNO) may be enabled to inform the owner of the 'Home NodeB' (and possibly all other users served by this particular miniature base station) about recent configuration changes or may ask in advance for permission to adjust the radio resource settings, respectively. This is favorable, because unlike a 'Femto Cell' box the user's UE usually offers a better user interface.

In yet another embodiment, the owner of the 'Home NodeB' may be enabled to request configuration changes from his Mobile Network Operator (MNO), e.g. in case he wants to have more (or all the) resources (temporarily) for himself (i.e. he may even be enabled to request the switch-off of the radio resource sharing feature). These kinds of requests can either be sent from the administrator's mobile terminal to his 'Home NodeB' or the 'Home NodeB' may be informed about these kind of requests by some other means (e.g. direct input, or via a Personal Computer being connected to the 'Home NodeB')

It should be noted that, although the allocation of radio resources is often mentioned as the predominant example in the described embodiments, alternative embodiments can be applied to resource allocations in general.

By way of example, the various embodiments can be applied to the backhaul connections provided by the network entities. As a consequence, the embodiments are intended to also cover all aspects of network resource allocation, such as the distribution of link resources on the S1 broadband connection (typically DSL, cable modem or fibre optics) to carry traffic between the 'Home NodeB' and the MNO's core network without using the macro network architecture. In practice, the owner of a 'Home NodeB' may allocate at his own discretion a certain amount of bandwidth of his S1 broadband connection for at least the following three purposes, for example:

a) normal internet traffic (what is meant is any traffic other than those evoked by his 'Home NodeB'),
b) CSG traffic (evoked by his 'Home NodeB'), and/or
c) PSG traffic (also evoked by his 'Home NodeB').

As will be described in more detail below, in various embodiments, 'Home Base Stations' (e.g. Home eNodeBs) may be provided with new CSG Operation Modes. Furthermore, 'CSG Cells' may also be (partially) opened to public users passing by.

Moreover, in various embodiments, an MNO may be enabled to:

dynamically allocate radio resources to dedicated 'Home Base Stations' in his communication network; and/or
share certain radio link resources (e.g., parts of the frequency spectrum, time slots and/or codes) between CSG-users and public users passing by; and/or
introduce new business models (e.g., refund for willingness to share one's 'Home Base Stations') between an MNO and his customers (based on tariff agreement).

Figure 6:
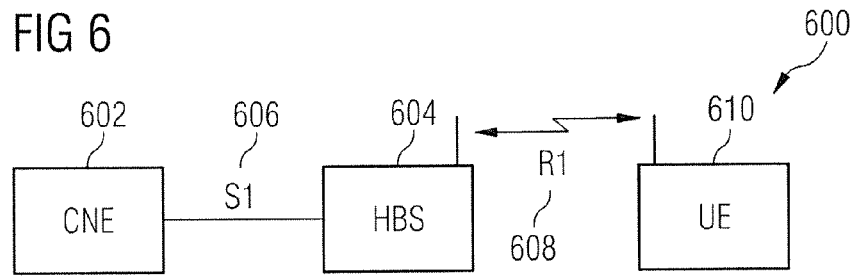
FIG. 6 shows a simplified architecture of a mobile radio communication system in accordance with an embodiment.

FIG. 6 shows a simplified architecture 600 of a mobile radio communication system in accordance with an embodiment In an embodiment, an eNodeB (eNB) may host a number of different functions, such as e.g. functions for Radio Resource Management, Radio Bearer Control, Radio Admission Control, Connection Mobility Control, IP header compression, and encryption of user data stream. The Mobility Management Entity (MME) located in the MNO's core network may host functions for the distribution of paging messages to the eNBs, security control, idle state mobility control, SAE bearer control, ciphering and integrity protection of NAS signaling, while the Serving Gateway (S-GW), which is also located in the MNO's core network, may host functions for switching the U-plane traffic to support UE mobility. In the following implementations, the Mobility Management Entity (MME) and the Serving Gateway (S-GW) are combined for simplicity in a logical entity called Core Network Entity (CNE) 602. In this implementation, the Core Network Entity (CNE) 602 may include all of the MME's and S-GW's functions in their entirety or parts thereof. In another implementation, the Core Network Entity (CNE) 602 may even include more core network functionalities such as HLR (Home Location Register) or SMSC (Short Message Service Center), and so on. The Home Base Station (HBS) 604 may be connected via the S1 interface 606 to the Core Network Entity (CNE) 602 and via the R1 interface 608, which may be a radio interface, to the mobile radio communication terminal device (e.g. a UE) 610.

In various embodiments, it is provided to split the radio resources of an HBS 604 into (at least) two categories, for example: one category for exclusive use by members of a closed subscriber group (CSG) (which is served by the respective HBS 604) and one category for public use (which may be users which are not members of the CSG). It should be mentioned that in alternative embodiments, the radio resources of an HBS 604 may be split in even more than two categories, e.g. depending on pre-settable priorities of different subscriber groups, or according to other pre-definable criteria (such as subscriber type classification, UE capabilities, customer usage pattern, etc.).

Figure 7:
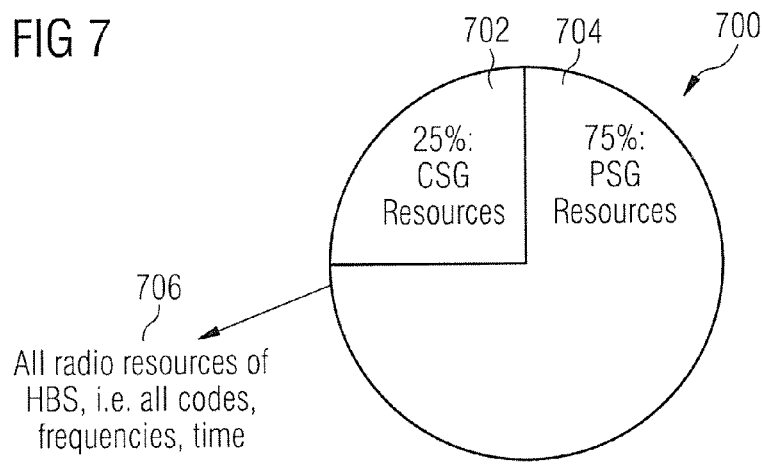
FIG. 7 shows a splitting of radio resource into "public subscriber group resources" (PSG Resources) and "closed subscriber group resources" (CSG Resources) in accordance with an embodiment.

FIG. 7 shows such a splitting of radio resource into "public subscriber group resources" (PSG Resources) and "closed subscriber group resources" (CSG Resources) in a resource diagram 700.

In this implementation, it is assumed that 25% of the radio resources are categorized as "CSG resources" (denoted in FIG. 7 with reference numeral 702), in other words, radio resources provided for members of the CSG only, and 75% are categorized as "PSG resources" (denoted in FIG. 7 with reference numeral 704), in other words, radio resources provided for public users.

An HBS 604 that has a certain amount of "PSG resources" 704 (i.e. more than 0%) may behave like a legacy (e) NodeB to public UEs passing by, i.e. public users can use this portion of the HBS's 604 capacity for communication. In case the HBS 604 has allocated all "PSG resources" 704, i.e. 75% of all radio resources 706 available in this cell, the behavior may differ from legacy (e) NodeBs: the HBS 604 may not accept new connection establishment requests from public UEs and will reject them instead. In other words: to the "outside world" the HBS 604 may behave like a legacy (e) NodeB, that has already allocated 100% of its radio resources. Members of the CSG are not affected from this rejection. They have the guarantee to use up to the full amount of "CSG resources" as configured previously regardless of how much load the public UEs cause in this cell.

In this implementation, the parameter that is used to configure the ratio of the two resource categories is called "radio resource splitting ratio (RRSR)". In the example of FIG. 7, the RRSR is 25 to 75.

In general, any other parameters required or provided to allocated/distribute the resources on the S broadband link may be needed or provided. In an embodiment, it is provided to use a "broadband resource splitting ratio (BRSR)" parameter for this purpose to distinguish between at least three different types of traffic.

Figure 8:
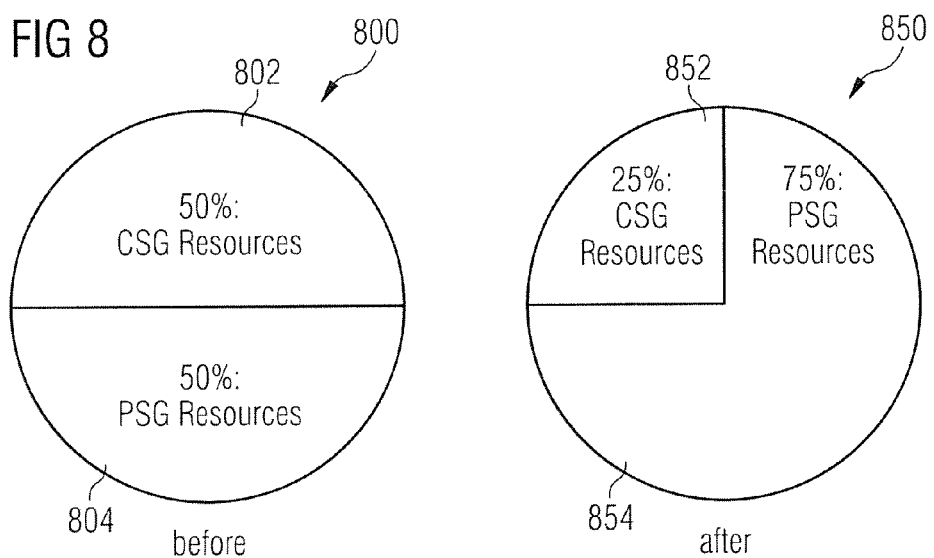
FIG. 8 shows an example of two possible radio resource configurations in a cell served by a Home Base Station (HBIS) before (in a first resource diagram) and after (in a second resource diagram) reconfiguration by a Mobile Network Operator in accordance with an embodiment.

FIG. 8 shows an example of two possible radio resource configurations in a cell served by an HBS before (in a first resource diagram 800) and after (in a second resource diagram 850) reconfiguration by the Mobile Network Operator in accordance with an embodiment.

In the first diagram 800 of FIG. 8, the RRSR is assumed to be 50 to 50 (in other words, 50% of the radio resources are categorized as CSG resources (denoted in FIG. 8 with reference numeral 802), and 50% of the radio resources are categorized as PSG resources (denoted in FIG. 8 with reference numeral 804). After execution of a Radio Resource Reconfiguration command by the HBS 604, as will be described in more detail below, the RRSR has been altered to 25 to 75, for example, as depicted in the second diagram 850 of FIG. 8, in other words, 25% of the radio resources are categorized as CSG resources (denoted in FIG. 8 with reference numeral 852), and 75% of the radio resources are categorized as PSG resources (denoted in FIG. 8 with reference numeral 854). This may happen either with or without involving the 'owner' of the HBS 604. Details about the exchange of messages that are provided to perform a radio resource reconfiguration in an HBS 604 will be described in more detail below.

Figure 9:
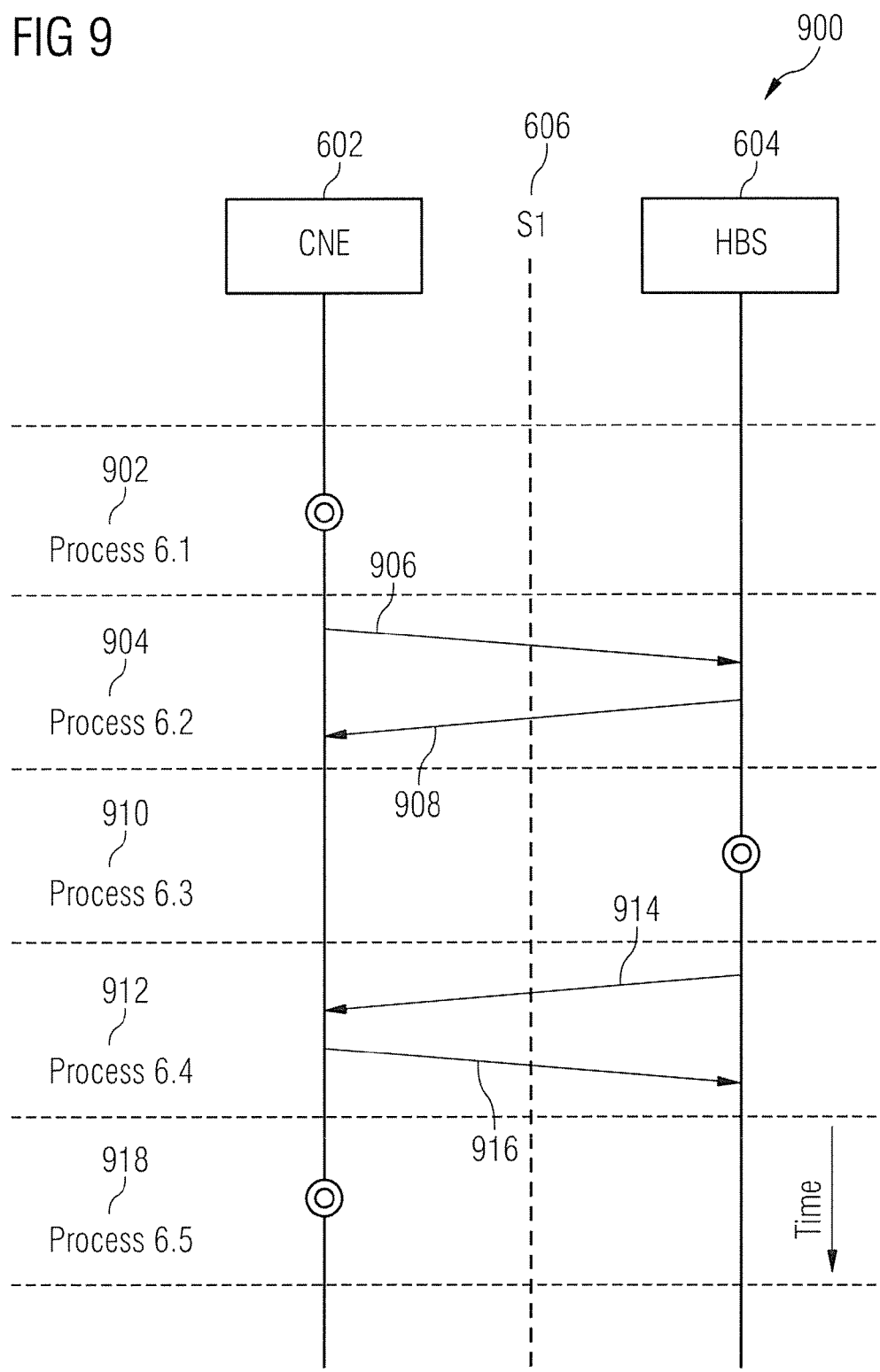
FIG. 9 shows a message flow diagram illustrating the processes for splitting radio resources in accordance with an embodiment.

FIG. 9 shows a message flow diagram 900 illustrating processes for splitting radio resources in accordance with an embodiment.

In a first process (e.g. Process 6.1, which is denoted in FIG. 9 with reference number 902), which will also be referred to as "Query Process" (please note that this process is optional), the Mobile Network Operator (MNO) (not shown in FIG. 9) may propose radio resource configuration changes in the 'Home Base Station' (HBS) 604 to the 'owner' of the 'Home Base Station' (HBS) 604 e.g., aiming at opening the CSG Cell for public users passing by. In case the Mobile Network Operator (MNO) decides to make a certain portion of the radio resources offered by the HBS 604 available to other users, the Mobile Network Operator (MNO) may ask the user of an HBS 604 for permission to reconfigure his HBS 604 accordingly. This request is initiated by the Core Network Entity (CNE) 602—for example as a query message, which may for instance be implemented as an RRC control message or via Short Message Service or via a Multimedia Messaging Service (MMS) or by other suitable means—and may be sent to the owner's User Equipment (UE) 610 either by an (e) NodeB of the macro network (Macro Cell) or by one of the Femto Cells associated to the Mobile Network Operator's (MNO) domain via the R1 interface 608 depending on the current location of the 'owner'. For this "Query Process" 902, a new pair of messages may be defined as follows: The corresponding macro cell or Femto Cell may send out an R1-Radio-Resource-Reconfiguration-Request message via the R1 interface 608. This request should be sent out to the User Equipment (UE) 610 of the 'owner' of the 'Home Base Station' (IHBS) 604, who may then be prompted to reply to the request via his handset's user interface. There may also be an automated functionality deployed in the user's handset 610 to create an automatic reply in an alternative embodiment. After that an R1-Radio-Resource-Reconfiguration-Response message may be sent back from the User Equipment (UE) 610 to the Core Network Entity (CNE) 602 containing the owner's approval or rejection, probably together with some additional conditions for the reconfiguration procedure, such as parameters related to the RRSR or timing constraints.

In an alternative implementation, it may be provided (also in combination with the Query process 902) that the user may request a predefined (alternatively, a user-settable) portion of the radio resources (e.g. 60%, 70%, 80%, 90%, or 100% of the totally available radio resources) and send a corresponding request message to the Core Network Entity (CNE) 602 and/or the HBS 604 from his User Equipment (UE) 610. The Core Network Entity (CNE) 602 and/or the HBS 604 may then correspondingly make an allocation of the radio resources and send a corresponding confirmation message to the UE 610 of the user. The user may be the owner of the HBS, alternatively, it may be another member of the CSG, for example.

In a second process (e.g. Process 6.2, which is denoted in FIG. 9 with reference number 904), the exchange of messages between the CNE 602 and the HBS 604 needed to enforce a radio resource reconfiguration in a 'Home Base Station' (HBS) 604, is provided, for example in case the Mobile Network Operator (MNO) decides to make a certain portion of the radio resources offered by the HBS 604 available to other users. For this purpose, the Core Network Entity (CNE) 602 may generate and send out an S1-Radio-Resource-Reconfiguration-Command message 906 via the S1 interface 606 to the 'Home Base Station' (HBS) 604 instructing the 'Home Base Station' (HBS) 604 to reconfigure its radio resources according to the details (information elements) contained in the S1-Radio Resource-Reconfiguration-Command message 906. These details may concern for instance radio resource splitting ratio (RRSR), carrier frequency allocations, time slot assignments, code allocations, etc. They may also include some parameters specified by the user in the preceding process 6.1 902 for the reconfiguration procedure, such as conditions related to the RRSR or timing constraints. As a response to the S1-Radio-Resource-Reconfiguration-Command message 906, the 'Home Base Station' (HBS) 604 may generate and send back an S1-Command-Confirmation message 908 to the Core Network Entity (CNE) 602.

The process of reconfiguring the radio resources of the Femto Cell in question based on the details (information elements) contained in the S1-Radio-Resource-Reconfiguration-Command message 906 may take place in a third process 6.3 of FIG. 9, which is denoted in FIG. 9 with reference number 910 (see FIG. 8 for two example radio resource distributions before and after having received the S1-Radio-Resource-Reconfiguration-Command 906 of process 6.2 904).

In another embodiment of process 6.3 910, the 'Home Base Station' (HBS) 604 may reconfigure the radio resources of the Femto Cell in question taking into account at least one of the following sets of information:

information contained in the S1-Radio-Resource-Reconfiguration-Command message 906 received via the S1 interface 606 from the CNE 602;

additional parameters (e.g., conditions) received from the 'owner' of the Home Base Station' (HBS) 604 that may preferably be also contained in the S1-Radio-Resource-Reconfiguration-Command message 906;

the current radio landscape at the location of the 'Home Base Station' (HBS) 604 derived from spontaneous local measurements;

information about the radio landscape at the location of the 'Home Base Station' (HBS) 604 derived from statistical analysis (collected over a certain period of time).

Then, in a fourth process (e.g. Process 6.4, which is denoted in FIG. 9 with reference number 912), after having set the radio resources appropriately, the 'Home Base Station' (HBS) 604 may inform the Core Network Entity (CNE) 602 about the outcome. It may therefore generate and convey in the fourth process 6.4 an S1-Reconfiguration-Result message 914 via the S1 interface 606 to the Core Network Entity (CNE) 602 containing some status information. The Core Network Entity (CNE) 602 may choose to confirm the reception of the S1-Reconfiguration-Result message 614 with an S1-Acknowledge message 916, which it generates and sends to the HBS 604.

Next, in a fifth process (e.g. Process 6.5, which is denoted in FIG. 9 with reference number 918), which may also be referred to as "Notification Process" (and which is an optional process), the Mobile Network Operator (MNO) may inform the 'owner' of the 'Home Base Station' (HBS) 604 about the outcome of the radio resource configuration changes in his Femto Cell. To do this, the Mobile Network Operator (MNO) may decide to generate and convey an R1-Reconfiguration-Information to the owner's User Equipment (UE) 610. This R1-Reconfiguration-Information message may be initiated by the Core Network Entity (CNE) 602—for example implemented as an RRC control message or via the Short Message Service (SMS) or via the Multimedia Message Service (MMS) or by other suitable means—and may be sent to the owner's User Equipment (UE) 610 either by an (e) NodeB of the macro network (Macro Cell) or by one of the Femto Cells associated to the Mobile Network Operator's (MNO) domain via the R1 interface 608 depending on the current location of the 'owner'. For this "Notification Process" 918, a new pair of messages may be defined as follows: The corresponding macro cell or Femto Cell may generate and send out an R1-Reconfiguration-Information message via the R1 interface 608. As a response, an R1-Information-Confirmation message may be generated and sent back from the owner's User Equipment (UE) 610 to the Core Network Entity (CNE) 602.

For the processes 6.1 902 and 6.5 918, in which user interaction is described, it may be appropriate to use a message transfer method that is independent from the kind of RAT the Mobile Network Operator chose to deploy in his network, such as SMS or MMS, for example, especially in cases where the 'owner' of the 'Home Base Station' (HBS) 604 is queried/needs to be informed while he is roaming in another operator's domain with a different RAT deployed.

The following table 1 shows the structure of examples of implementations of the messages as described above. It should be noted that this is only an example and the actual structure and content of the messages may differ in alternative implementations.

TABLE 1

Overview of messages provided in the processes in accordance with an embodiment

| Message Name | Appearance | Disposition | S1 | R1 | Direction |
|---|---|---|---|---|---|
| R1-Radio-Resource-Reconfiguration-Request | Process 6.1 | Optional | | X | CNE -> UE |
| R1-Radio-Resource-Reconfiguration-Response | Process 6.1 | Optional | | X | UE -> CNE |
| S1-Radio-Resource-Reconfiguration-Command | Process 6.2 | Mandatory | X | | CNE -> HBS |
| S1-Command-Confirmation | Process 6.2 | Mandatory | X | | HBS -> CNE |
| S1-Reconfiguration-Result | Process 6.4 | Mandatory | X | | HBS -> CNE |
| S1-Acknowledge | Process 6.4 | Mandatory | X | | CNE -> HBS |
| R1-Reconfiguration-Information | Process 6.5 | Optional | | X | CNE -> UE |
| R1-Information-Confirmation | Process 6.5 | Optional | | X | UE -> CNE |

Figure 10:
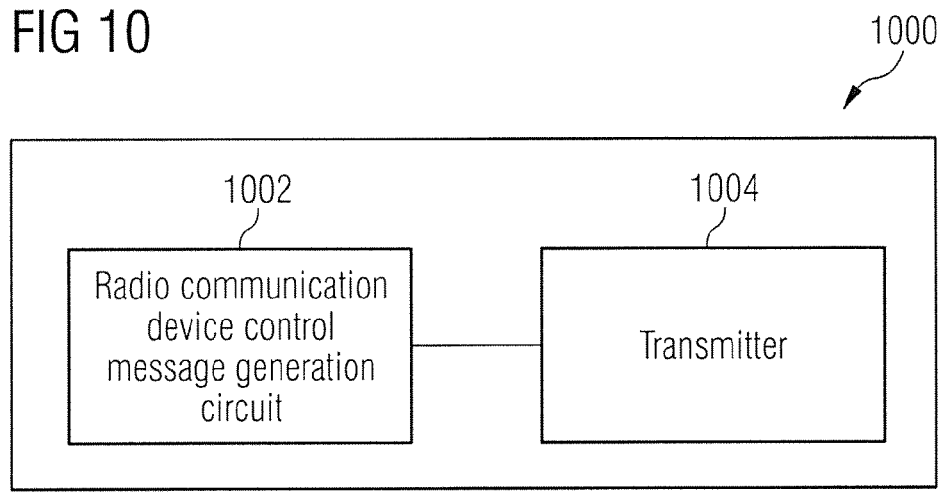
FIG. 10 shows a radio communication device in accordance with an embodiment.

FIG. 10 shows a radio communication device 1000 in accordance with an embodiment. In this embodiment, the radio communication device 1000 may include a radio communication device control message generation circuit 1002 configured to generate a radio communication device control message including allocation information to control a (e.g. radio) resource allocation for radio communication devices of at least two groups of radio communication devices, the (e.g. radio) resource allocation being provided by another radio communication device. The radio communication device 1000 may further include a transmitter 1004 (which may be coupled to the radio communication device control message generation circuit 1002) configured to transmit the radio communication device control message to the other radio communication device. In an alternate embodiment, the radio communication device 1000 in FIG. 10 may include a radio communication device control message generation circuit 1002 to generate control messages aiming at distributing the resources of the S1 broadband connection at least between three parties: a) 'normal' internet traffic, b) CSG traffic, and c) PSG traffic (as explained in one example above).

In an example of this embodiment, the other radio communication device may be a base station, e.g. a home base station, e.g. a cellular mobile radio home base station.

Furthermore, in another example of this embodiment, a first group of the at least two groups of radio communication devices may be a closed subscriber group (which may include specifically registered radio communication terminal devices of a specific group that is handled by the other radio communication device), and a second group of the at least two groups of radio communication devices may be a public subscriber group (which may include any radio communication terminal devices (in particular the radio communication terminal devices not registered in the closed subscriber group)).

In yet another example of this embodiment, a first group of the at least two groups of radio communication devices may be a first closed subscriber group, and a second group of the at least two groups of radio communication devices may be a second closed subscriber group.

In yet another example of this embodiment, the allocation information may include information to allocate and control resources of a radio link, and/or information to allocate and control resources of a broadband connection.

By way of example, the radio link may be established over interface R1 between the radio communication device and the other radio communication device. In another example, the broadband connection may be established over interface S1 between the other radio communication device and a network entity.

By way of example, the radio resource allocation on R1 interface may be used to allocate resources for at least two groups of radio communication device and the broadband resource allocation on the S1 interface may be used to allocate resources for at least three different types of traffic.

In yet another example of this embodiment, the radio communication device 1000 may be configured as a radio network entity, e.g. as a radio network controller, e.g. as a radio network controller in accordance with a Third Generation Partnership Project mobile radio communication technology, such as UMTS or LTE. By way of example, the radio communication device 1000 may be configured as a radio network controller in accordance with at least one of the following alternative mobile radio communication technologies: Code Division Multiple Access 2000 (CDMA 2000) technology, and/or Freedom of Mobile Multimedia Access (FOMA) technology.

In yet another example of this embodiment, the radio communication device 1000 may be configured as a radio communication terminal device, e.g. as a radio communication terminal device in accordance with a Third Generation Partnership Project mobile radio communication technology, such as UMTS or LTE. By way of example, the radio communication device 1000 may be configured as a radio communication terminal device in accordance with at least one of the following alternative mobile radio communication technologies: Code Division Multiple Access 2000 (CDMA 2000) technology, and/or Freedom of Mobile Multimedia Access (FOMA) technology.

In yet another example of this embodiment, the radio communication device control message generation circuit may be configured to generate a radio communication device control message including allocation information to control resource allocations on at least two different interfaces for radio communication devices of at least two groups of radio communication devices, the radio resource allocation being provided by another radio communication device.

Figure 11:
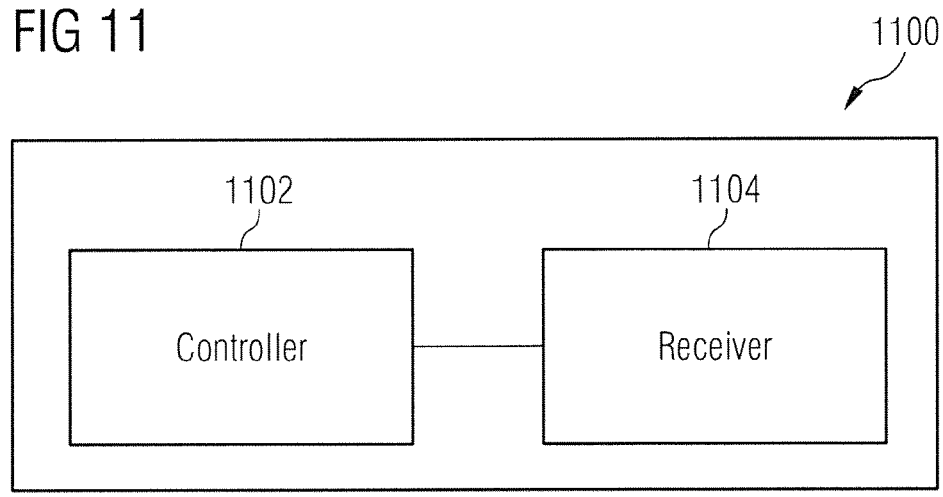
FIG. 11 shows another radio communication device in accordance with an embodiment.

FIG. 11 shows another radio communication device 1100 in accordance with an embodiment. In this embodiment, the radio communication device 1100 is a home base station 1100 and may include at least one controller 1102 configured to control a radio resource allocation for radio communication devices of at least two groups of radio communication devices in accordance with a received home base station control message including allocation information to control a radio resource allocation for at least two groups of radio communication devices. The home base station 1100 may further include a receiver 1104 configured to receive the home base station control message from a radio communication device.

In an example of this embodiment, the radio communication device 1100 may include a plurality of controllers, e.g. one controller for each provided interface.

In an example of this embodiment, the home base station 1100 may be a cellular mobile radio home base station.

Furthermore, in another example of this embodiment, a first group of the at least two groups of radio communication devices may be a closed subscriber group (which may include specifically registered radio communication terminal devices of a specific group that is handled by the respective home base station 1100), and a second group of the at least two groups of radio communication devices may be a public subscriber group (which may include any radio communication terminal devices (in particular the radio communication terminal devices not registered in the closed subscriber group)).

In yet another example of this embodiment, a first group of the at least two groups of radio communication devices may be a first closed subscriber group, and a second group of the at least two groups of radio communication devices is a second closed subscriber group.

In yet another example of this embodiment, the radio communication device 1100 may be configured as a radio network entity, e.g. as a radio network controller, e.g. as a radio network controller in accordance with a Third Generation Partnership Project mobile radio communication technology, such as UMTS or LTE. By way of example, the radio communication device 1100 may be configured as a radio network controller in accordance with at least one of the following alternative mobile radio communication technologies: Code Division Multiple Access 2000 (CDMA 2000) technology, and/or Freedom of Mobile Multimedia Access (FOMA) technology.

In another embodiment, a radio communication device is provided, which may include a home base station control message generation circuit configured to generate a home base station control message including information to control radio resources to be provided by a home base station for different groups of radio communication devices and/or resources of a broadband connection between a home base station and an operator's (e.g. a radio communication network operator's) core network for at least two groups of devices and/or for at least three types of traffic. The radio communication device may further include a transmitter configured to transmit the home base station control message to the home base station.

In an example of this embodiment, the home base station may be a cellular mobile radio home base station.

Furthermore, in another example of this embodiment, the home base station control message generation circuit may be configured to generate the home base station control message including information to control radio resources for at least two groups of radio communication devices and/or resources of a broadband connection between a home base station and an operator's (e.g. a radio communication network operator's) core network for at least two groups of devices and/or for at least three types of traffic.

In yet another example of this embodiment, a first group of the at least two groups of radio communication devices may be a closed subscriber group, and a second group of the at least two groups of radio communication devices may be a public subscriber group.

In yet another example of this embodiment, a first group of the at least two groups of radio communication devices may be a first closed subscriber group, and a second group of the at least two groups of radio communication devices may be a second closed subscriber group.

In yet another example of this embodiment, the radio communication device may be configured as a radio network entity, e.g. as a radio network controller, e.g. as a radio network controller in accordance with a Third Generation Partnership Project mobile radio communication technology, such as UMTS. By way of example, the radio communication device may be configured as a radio network controller in accordance with at least one of the following alternative communication technologies: Code Division Multiple Access 2000 (CDMA 2000) technology, and/or Freedom of Mobile Multimedia Access (FOMA) technology.

In another embodiment, a home base station is provided, which may include a controller configured to control radio resources for radio communication devices of different groups of radio communication devices in accordance with a received home base station control message including information to control radio resources provided for different groups of radio communication devices. The home base station may further include a receiver configured to receive the home base station control message from a radio communication device.

In an example of this embodiment, the home base station is a cellular mobile radio home base station.

Furthermore, in another example of this embodiment, a first group of the different groups of radio communication devices may be a closed subscriber group, and a second group of the different groups of radio communication devices may be a public subscriber group.

In yet another example of this embodiment, a first group of the different groups of radio communication devices may be a first closed subscriber group, and a second group of the different groups of radio communication devices may be a second closed subscriber group.

In yet another example of this embodiment, the radio communication device may be configured as a radio network controller, e.g. as a radio network controller in accordance with a Third Generation Partnership Project mobile radio communication technology, such as UMTS or LTE. By way of example, the radio communication device may be configured as a radio network controller in accordance with at least one of the following alternative communication technologies: Code Division Multiple Access 2000 (CDMA 2000) technology, and/or Freedom of Mobile Multimedia Access (FOMA) technology.

Figure 12:
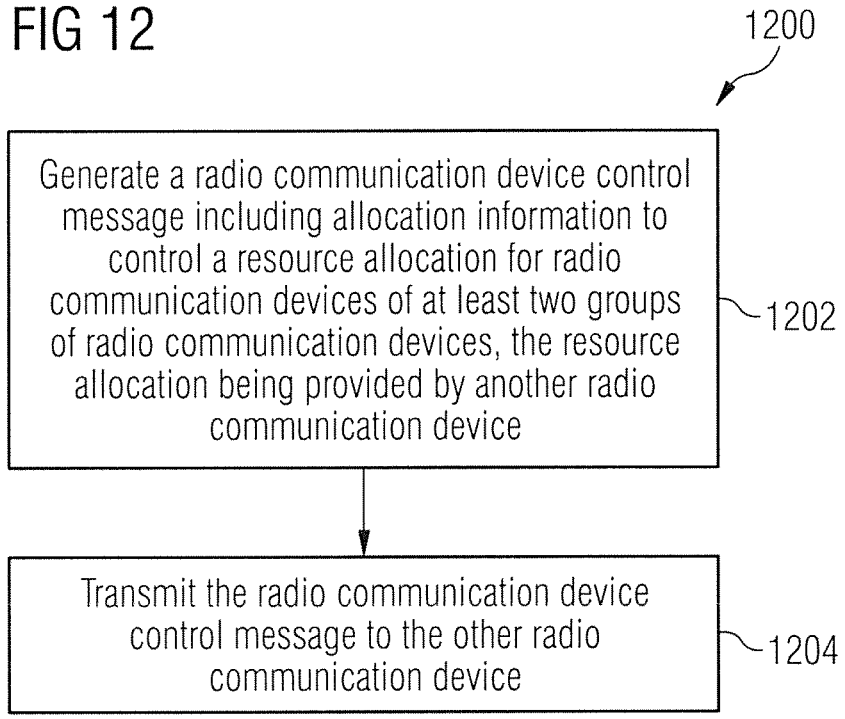
FIG. 12 shows a method for generating a radio communication device control message in accordance with an embodiment.

In another embodiment, a method 1200 (see FIG. 12) for generating a radio communication device control message is provided, wherein, in 1202, the radio communication device control message is generated including allocation information to control a radio resource allocation for radio communication devices of at least two groups of radio communication devices, the radio resource allocation being provided by another radio communication device and/or resources of a broadband connection between a home base station and an operator's (e.g. a radio communication network operator's) core network for at least two groups of devices and/or for at least three types of traffic. The method 1200 may further include, in 1204, transmitting the radio communication device control message to the other radio communication device.

In an example of this embodiment, the other radio communication device may be a base station, e.g. a home base station, e.g. a cellular mobile radio home base station.

Furthermore, in another example of this embodiment, a first group of the at least two groups of radio communication devices may be a closed subscriber group (which may include specifically registered radio communication terminal devices of a specific group that is handled by the other radio communication device), and a second group of the at least two groups of radio communication devices may be a public subscriber group (which may include any radio communication terminal devices (in particular the radio communication terminal devices not registered in the closed subscriber group)).

In yet another example of this embodiment, a first group of the at least two groups of radio communication devices may be a first closed subscriber group, and a second group of the at least two groups of radio communication devices may be a second closed subscriber group.

In yet another example of this embodiment, the radio communication device 1000 may be configured as a radio network entity, e.g. as a radio network controller, e.g. as a radio network controller in accordance with a Third Generation Partnership Project mobile radio communication technology, such as UMTS or LTE. By way of example, the radio communication device may be configured as a radio network controller in accordance with at least one of the following alternative radio communication technologies: Code Division Multiple Access 2000 (CDMA 2000) technology, and/or Freedom of Mobile Multimedia Access (FOMA) technology.

Figure 13:
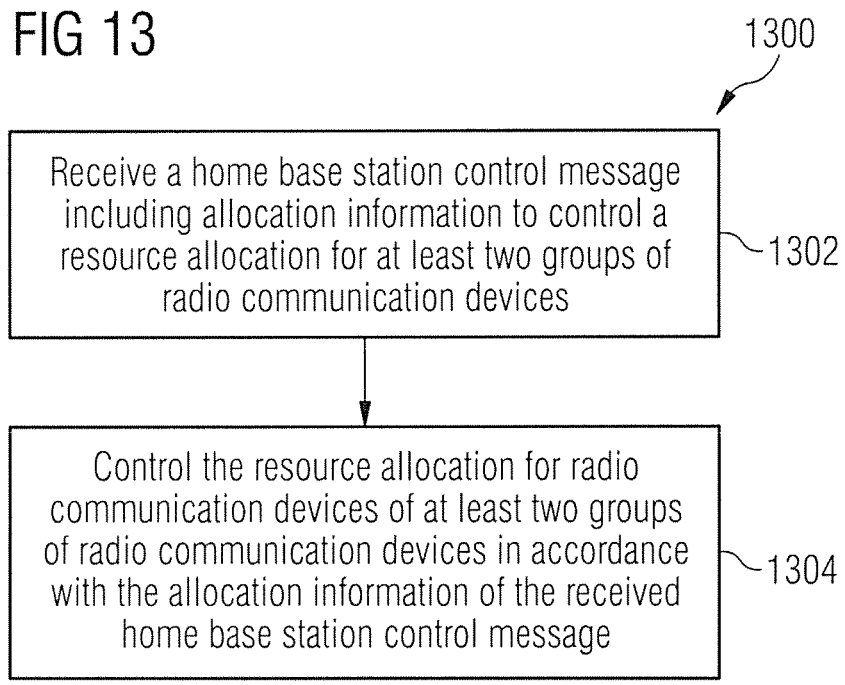
FIG. 13 shows a method for controlling a resource allocation in accordance with an embodiment.

In yet another embodiment, a method 1300 (see FIG. 13) for controlling a radio resource allocation is provided. The method 1300 may include in 1302, receiving a home base station control message including allocation information to control a radio resource allocation for at least two groups of radio communication devices, and, in 1304, controlling the radio resource allocation for radio communication devices of at least two groups of radio communication devices and/or resources of a broadband connection between a home base station and an operator's (e.g. a radio communication network operator's) core network for at least two groups of devices and/or for at least three types of traffic in accordance with the allocation information of the received home base station control message.

In an example of this embodiment, the home base station may be a cellular mobile radio home base station.

Furthermore, in another example of this embodiment, a first group of the at least two groups of radio communication devices may be a closed subscriber group (which may include specifically registered radio communication terminal devices of a specific group that is handled by the respective home base station 1100), and a second group of the at least two groups of radio communication devices may be a public subscriber group (which may include any radio communication terminal devices (in particular the radio communication terminal devices not registered in the closed subscriber group)).

In yet another example of this embodiment, a first group of the at least two groups of radio communication devices may be a first closed subscriber group, and a second group of the at least two groups of radio communication devices is a second closed subscriber group.

In yet another example of this embodiment, the radio communication device may be configured as a radio network entity, e.g. as a radio network controller, e.g. as a radio network controller in accordance with a Third Generation Partnership Project mobile radio communication technology, such as UMTS or LTE. By way of example, the radio communication device may be configured as a radio network controller in accordance with at least one of the following alternative radio communication technologies: Code Division Multiple Access 2000 (CDMA 2000) technology, and/or Freedom of Mobile Multimedia Access (FOMA) technology.

While the invention has been particularly shown and described with reference to specific embodiments, it should be understood by those skilled in the art that various changes in formn and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device, comprising:
a radio communication device control message generation hardware circuit configured to generate a radio communication device control message that is to indicate, to a home base station adapted to provide a cell, a first amount of radio resources associated with the cell to be allocated to a Closed Subscriber Group and a second amount of radio resources associated with the cell to be allocated to a Public Subscriber Group, wherein the first amount of radio resources is only available to one or more radio communication terminal devices associated with the Closed Subscriber Group and usage of radio resources associated with the cell by radio communication terminal devices associated with the Public Subscriber Group cannot exceed the second amount.

2. The radio communication device of claim 1, further comprising:
a transmitter configured to transmit the radio communication device control message to the home base station.

3. The radio communication device of claim 1,
wherein the first and second amounts are indicated in the radio communication device control message as first and second percentages, respectively.

4. The radio communication device of claim 1,
wherein the radio communication device control message further includes
information to allocate and control resources of a broadband connection associated with the home base station.

5. The radio communication device of claim 1,
wherein the one or more radio communication terminal devices associated with the Closed Subscriber Group include a list having an identity associated with the home base station that is to indicate the one or more radio communication terminal devices are allowed to use the home base station for communication.

6. The radio communication device of claim 1,
wherein the home base station is a femtocell.

7. The radio communication device of claim 1,
wherein the radio communication device is configured as a radio network entity.

8. The radio communication device of claim 1,
wherein the radio communication device is configured as a radio communication terminal device that is associated with the Closed Subscriber Group.

9. The radio communication device of claim 1,
wherein the radio communication device control message generation hardware circuit is configured to generate a radio communication device control message comprising allocation information to control resource allocations on at least two different interfaces for radio communication devices of at least two groups of radio communication devices, the radio resource allocation being provided by another radio communication device.

10. A home base station to provide a cell, comprising:
at least one controller configured to control resource allocations for radio communication devices of at least two groups of radio communication devices in accordance with a received home base station control message generated from a radio communication device, the home base station control message to indicate a first amount of radio resources associated with the cell to be allocated to a Closed Subscriber Group and a second amount of radio resources associated with the cell to be allocated to a Public Subscriber Group, wherein the first amount of radio resources is only available to one or more radio communication terminal devices associated with the Closed Subscriber Group and usage of radio resources associated with the cell by radio communication terminal devices associated with the Public Subscriber Group cannot exceed the second amount.

11. The home base station of claim 10, further comprising:
a receiver configured to receive the home base station control message from the radio communication device.

12. The home base station of claim 10,
wherein the home base station is a cellular mobile radio home base station.

13. The home base station of claim 10,
wherein the home base station is a femtocell.

14. The home base station of claim 11,
wherein the radio communication device is configured as a radio network entity.

15. The home base station of claim 11,
wherein the radio communication device is configured as a radio communication terminal device.

16. A radio communication device, comprising:
a home base station control message generation hardware circuit configured to generate a home base station control message generated from the radio communication device comprising information to control resources selected from a group of resources consisting of:
radio resources, associated with a cell to be provided by a home base station, to be allocated at least between a Closed Subscriber Group and a Public Subscriber Group, wherein a first amount of radio resources is only available to one or more radio communication terminal devices associated with the Closed Subscriber Group such that radio communication terminal devices associated with the Public Subscriber Group cannot use the first amount of radio resources associated with the cell,
resources of a broadband connection between a home base station and an operator's core network for at least two types of devices; and
resources of a broadband connection between a home base station and an operator's core network for at least three types of traffic,
the radio communication device being a member of the Closed Subscriber Group.

17. The radio communication device of claim 16,
wherein the home base station is a cellular mobile radio home base station.

18. The radio communication device of claim 16, wherein the home base station is a femtocell.

19. The radio communication device of claim 18, wherein the one or more radio communication terminal devices associated with the Closed Subscriber Group include a list having an identity associated with the home base station that is to indicate the one or more radio communication terminal devices are allowed to use the home base station for communication.

20. A home base station, comprising:
a controller configured to control resources for communication devices of different groups of communication devices in accordance with a received home base station control message generated from a radio communication device comprising information to control resources selected from a group of resources consisting of:
radio resources, associated with a cell to be provided by the home base station, to be allocated at least between a Closed Subscriber Group and a Public Subscriber Group, wherein a first amount of radio resources is only available to one or more radio communication terminal devices associated with the Closed Subscriber Group such that radio communication terminal devices associated with the Public Subscriber Group cannot use the first amount of radio resources associated with the cell,
resources of a broadband connection between a home base station and an operator's core network,
the radio communication device being a member of the Closed Subscriber Group.

21. The home base station of claim 20, wherein the home base station is a cellular mobile radio home base station.

22. The home base station of claim 20, wherein the one or more radio communication terminal devices associated with the Closed Subscriber Group include a list having an identity associated with the home base station that is to indicate the one or more radio communication terminal devices are allowed to use the home base station for communication.

23. The home base station of claim 20, wherein the radio communication device is configured as a radio communication terminal device.

24. A method for controlling a radio resource allocation, the method comprising:
receiving a home base station control message comprising allocation information to control resource allocations from a home base station adapted to provide a cell; and
controlling resources, associated with the cell, to be allocated at least between a Closed Subscriber Group and a Public Subscriber Group, wherein a first amount of radio resources is only available to one or more radio communication terminal devices associated with the Closed Subscriber Group such that radio communication terminal devices associated with the Public Subscriber Group cannot use the first amount of radio resources associated with the cell.

\* \* \* \* \*